Figure 1:
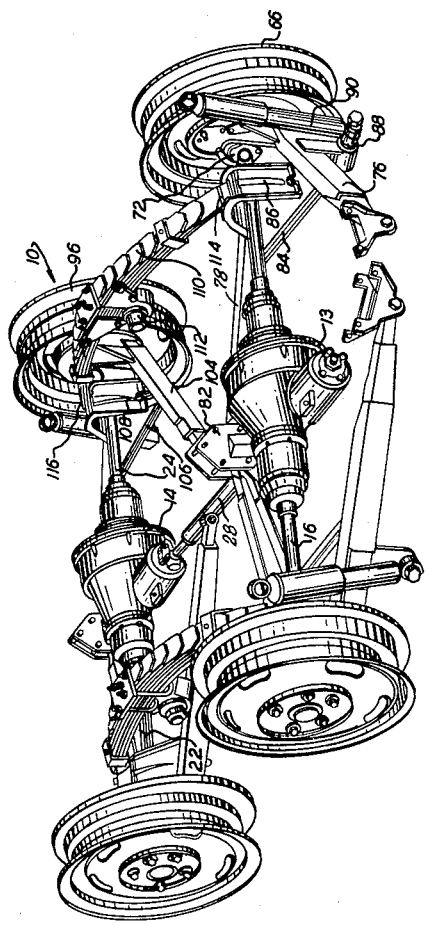

ROBERT E. KRAEMER
JOHN T. KOWALL
Inventors

ROBERT E. KRAEMER
JOHN T. KOWALL
Inventors

United States Patent Office 3,157,238
Patented Nov. 17, 1964

3,157,238
INDEPENDENT BOGIE SUSPENSION
Robert E. Kraemer and John T. Kowall, Dearborn, Mich., assignors to Ford Motor Company, Dearborn, Mich., a corporation of Delaware
Original application Dec. 24, 1959, Ser. No. 861,905, now Patent No. 3,077,942, dated Feb. 19, 1963. Divided and this application Jan. 2, 1962, Ser. No. 164,646
1 Claim. (Cl. 180—22)

The present invention relates to suspension systems for motor vehicles and more particularly to an independent suspension system for trucks having tandem rear axles. This is a division of our application Serial Number 861,905, filed December 24, 1959, now Patent 3,077,942.

In trucks where ground load requirements are such that 6 wheels are required, it is conventional to employ two sets of driving wheels. By using tandem axles, the weight is spread over greater tire contact area to reduce the ground loading.

In certain situations such as those encountered by military services where the vehicles are often employed in off-the-road applications, this reduced ground loading becomes very important, particularly if the terrain is soft. In such cases tandem axles are used even though the gross vehicle weight may be relatively low.

It has also been long recognized in the automotive art that an independent suspension system offers definite advantages. Specifically, it improves the riding qualities of the vehicle by reducing unsprung weight and, in addition, increases its controllability and performance.

Where a truck or personnel carrier is operated in off-the-road situations, the requirement for an independent rear suspension becomes critical because it is necessary that the driving wheels be in full operative contact with the ground at all times, regardless of the irregularities in its surface.

In consideration of the foregoing, it is therefore the principal object of the present invention to provide a vehicle having tandem driving wheels in combination with a novel rear suspension arrangement in which the driving wheels are independently secured to the vehicle chassis.

It is a further object of the present invention to provide in such a vehicle two sets of independently suspended rear driving wheels which are joined by a single set of pivoted spring suspension members.

More specifically, the present invention comprehends a suspension system for a vehicle having tandem sets of driving wheels wherein the differential gearing for each set of driving wheels is secured to the vehicle chassis and swing axles extend laterally from the differentials to the driving wheels. The wheels are carried by support arms that are pivotally secured to the chassis. The independently suspended wheels on each longitudinal side of the vehicle are interconnected by a suspension member which is pivotally mounted to the chassis at its mid-point and supports wheel structure at its outer ends. In effect, the present invention provides bogie-type springing for independently suspended tandem driving wheels.

Figure 2:
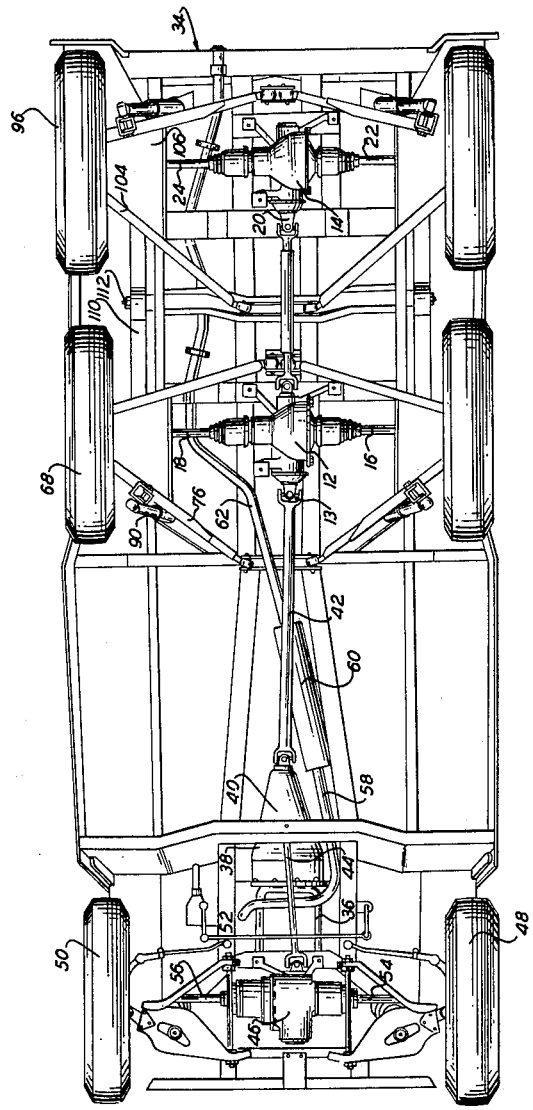
Figure 3:
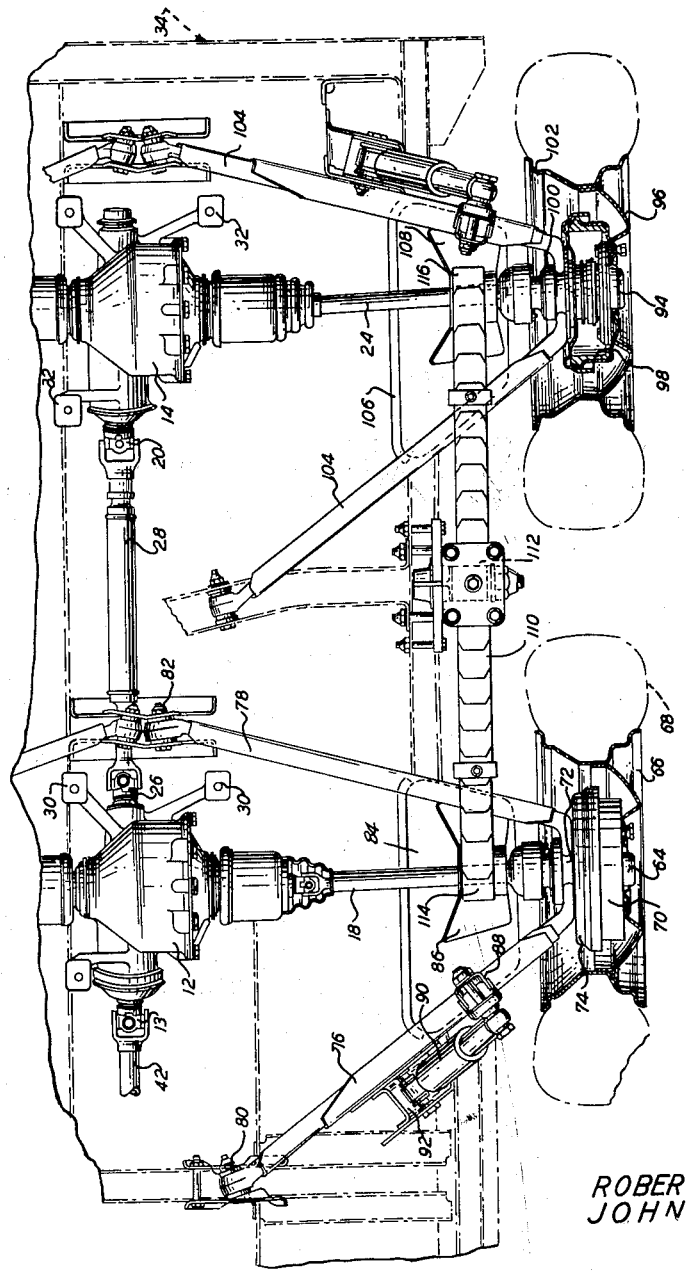
Figure 4:
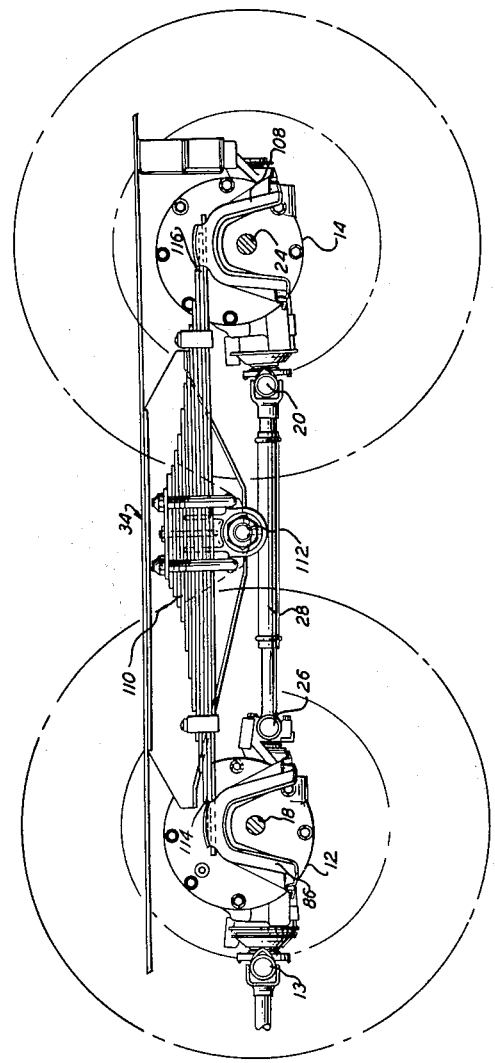
Figure 5:
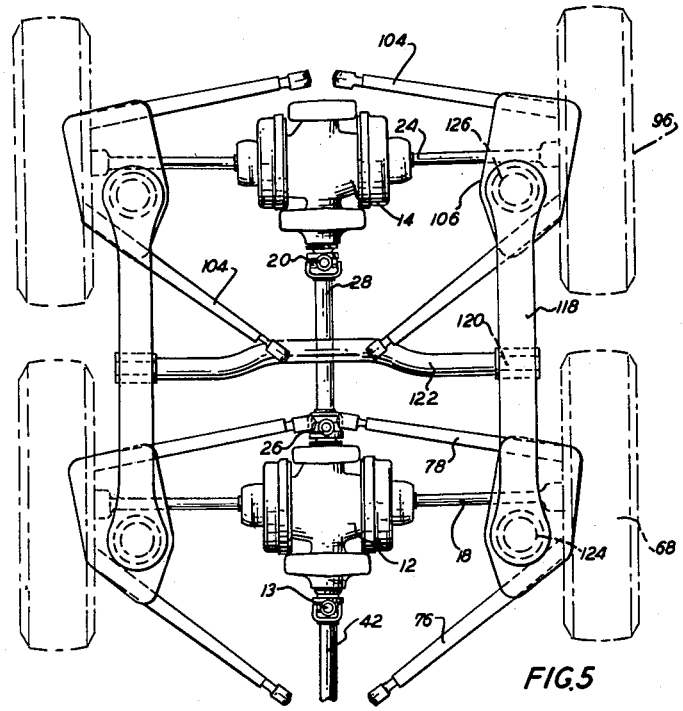
Figure 6:
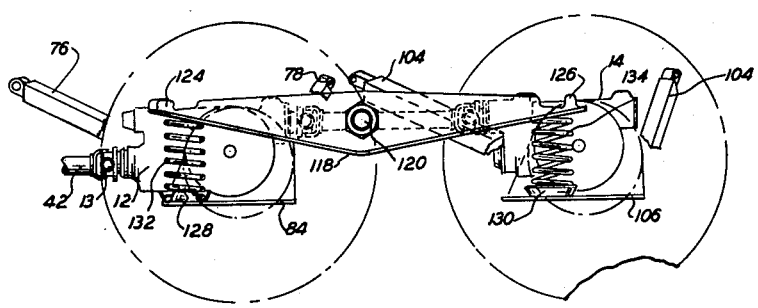

These and further objects of the present invention will become amply apparent from the following detailed discussion, and the accompanying drawings, wherein:

FIGURE 1 is a perspective view of an independent suspension system for tandem axles constructed in accordance with the present invention, FIGURE 2 is a bottom plan view of a 6-wheel motor vehicle incorporating the suspension of FIGURE 1, FIGURE 3 is an enlarged top plan view of a portion of the suspension system of FIGURE 2, FIGURE 4 is a side elevational view of the suspension system, FIGURE 5 is a top plan view of a modification of the present suspension system, and FIGURE 6 is a side elevational view of the device of FIGURE 5.

Referring now to the drawings for a more detailed description of the preferred embodiments of the present invention, wherein like reference numerals identify like parts throughout the various views, there is shown in FIGURE 1 an independent suspension system 10. The suspension system 10 includes front and rear differential gear units 12 and 14, respectively. The front differential 12 receives power at a universal joint 13 and distributes the power by its internal gearing to swing axles 16 and 18.

The aft or second differential 14 receives power at its input 20 and distributes it to the right and left swing axles 22 and 24, respectively. The forward differential 12 is provided with a power output shaft 26 which forms an extension of the pinion shaft (not shown) within the differential 12. A short driveshaft 28 interconnects the output 26 of the differential 12 to the input 20 of the differential 14.

In FIGURE 2 the present suspension system 10 is shown incorporated in a six wheel vehicle having a body generally indicated by the reference numeral 34. In this particular embodiment the body 34 is of unitized construction wherein a separable frame is not employed, although the invention is equally appropriate to vehicle construction having a separable frame. With unitized construction, girders and frame members are integrally formed of body sheet metal. Mounting brackets 30 and 32 which form a part of the differentials 12 and 14 are rigidly secured to appropriate integral frame members which are provided in the body 34.

The vehicle of FIGURE 2 is provided with an engine 36 mounted at the forward end of the body 34. Bolted to the rear end of the engine 36 is a transmission case 38 and a transfer case 40. A driveshaft 42 interconnects the universal joint 13 of differential 12 to an output of the transfer case 40.

A second driveshaft 44 is connected to a second output (not shown) of the transfer case 40 and delivers power forwardly to a differential 46 which is disposed between the two independently sprung front wheels 48 and 50. Differential 46 is bolted by its brackets 52 to the integral frame of the body 34. Swing axles 54 and 56 are interposed between the differential 46 and the wheels 48 and 50, respectively. The steering mechanism and suspension arrangement for the front wheels of the vehicle are of conventional construction and therefore need not be described.

The engine is provided with an exhaust system which includes an exhaust pipe 58, muffler 60, and tailpipe 62. The latter member extends to the rearmost limit of the body 34.

Referring now to FIGURE 3 for a more detailed description of the independent tandem suspension system 10. Components for the left hand side only are disclosed as those provided on the right side are of identical construction and arrangement. The outer extremity of the swing axle 18 is connected to a wheel hub 64. A conventional drop center integral wheel and rim 66 is bolted to the hub 64 and carries a pneumatic tire 68 shown in outline form. A brake drum 70 also forms part of the rotating structure. The wheel bearing (not shown) is contained within stationary structure 72 which also has the backing plate 74 for the brake secured thereto. A pivotally connected support member having fore and aft arms 76 and 78 is affixed at its outer end to the structure 72 and at its inner end to the pivot supports 80 and 82. The supports 80, 82 are welded to integral frame members of the body 34. In the particular construction under consideration, a universal joint is provided between the swing axle 18 and the differential 12. However, no universal joint is provided between the end of the swing axle 18 and the driving wheel 66 permitting the use of but a single support arm member to suffice.

A sheet metal member 84 is welded to the support arm member between arms 76 and 78 and is located beneath the swing axle 18. An arch-shaped spring support 86 is welded to the plate member 84 and passes over axle 18. Secured to the arm 76 is a shock absorber support 88 which has a direct acting hydraulic plunger type shock absorber 90 pivotally secured thereto. The upper end of the shock absorber 90 is secured to a pivot mount 92 welded to the integral frame of the body 34.

The rearmost differential 14 is associated with independently suspended driving wheels in a manner similar in construction to that previously described in connection with differential 12. Swing axle 24 has a hub portion 94 to which a flange for supporting a wheel 96 and brake drum 98 are affixed. A stationary support member 100 carries the wheel bearing, the brake backing plate, and the outer ends of a pivotally mounted support arm 104. A plate member 106 is provided between the branches of arm 104 and has an arch-shaped member 108 that encircles the shaft 24.

A spring member is interposed between the two swing axles and the body of the vehicle. Such construction comprises a leaf spring 110 which has a pivoted connection 112 at its mid-point to the integral frame of the body 34. The outer ends 114 and 116 of spring 110 rest against the arch-shaped members 86 and 108, respectively. Spring shackles are not required at the ends of the springs, since no torque loads are borne by these units.

Referring to FIGURE 1, where both the left and right sides of the suspension system are shown, it is apparent that the support arms, wheel springs, and the like, are symmetrical about the longitudinal center line of the vehicle. For this reason, the right hand portion of the suspension system need not be described in detail.

Reviewing the foregoing construction, it is seen that differentials 12 and 14 are rigidly secured to the vehicle body 34, that the wheels on each of the lateral sides of the vehicle are independent in their movement as compared with conventional tandem driving wheels where a solid axle or a solid axle and differential housing is used. Although there is lateral independence of the axles and wheels, there is bogie-type springing between the wheels on each of the longitudinal sides of the vehicle. This is provided by the pivotally mounted leaf spring 110 which interconnects and supports the tandemly related wheels.

In operation, if two wheels on one side of the vehicle strike holes simultaneously, the rebound will not be transmitted to the two wheels on the other sides of the vehicle. If one wheel on a given side strikes a bump the jounce will be transmitted to the other wheel on the same side through the spring thus lessening the reaction on the vehicle body, however, wheels on the opposite side of the vehicle are not affected. Laterally, the suspension system is of an independent type, but longitudinally, it is of a bogie type, hence, the descriptive name, independent bogie suspension.

Referring to the FIGURES 5 and 6, an alternate or modified structure of the present invention is shown wherein the differentials, axles, wheel supports, and wheels are all of similar construction to that previously described. In this modification, the distinguishing feature is the spring connection provided between the tandemly arranged wheels on each of the sides of the vehicle.

A pivotally mounted beam member 118 is connected at 120 to a frame member 122. Member 118 is of elongated configuration and is provided with helical spring seats 124 and 126 at its fore and aft ends. Complementary spring seats 128 and 130 are provided on the pan members 84 and 106, respectively. Interposed between the spring seats 124 and 128 is a coil spring 132 and similarly, a spring 134 is interposed between seats 126 and 130.

The construction of FIGURES 5 and 6 provides a structure which in operation is similar to that of FIGURES 1 through 4, that is, it is of the independent bogie type. Considering the wheel movement on a given side of the vehicle, forces will be transmitted from one wheel to its coil spring through the pivotally mounted beam 118 and through the other coil spring to the other wheel. However, no forces will be transferred to the suspension structure on the opposite side.

The present invention, in any of its alternate forms or modifications, provides a vehicle suspension system which uniquely and simply combines the advantages of both tandem suspension and independent suspension. A vehicle employing such construction is particularly adapted to off-the-road uses and unimproved roads.

The foregoing description constitutes the preferred embodiment and modification of the present invention. However, other arrangements may occur to those skilled in the art which will come within the scope and spirit of the appended claim.

We claim:

In a motor vehicle having a rigidly mounted engine, a power shaft extending from said engine, a pair of tandemly situated power receiving and distributing differential gear units, said gear units being secured to said vehicle, said power shaft being connected to one of said gear units, a second power shaft interconnecting said gear units, swing axles universally joined to said gear units, said axles extending laterally to the sides of said vehicle, ground engaging wheels secured to the outer ends of said axles, laterally extending support arms pivotally secured at their inner ends to said vehicle and rotatably secured to said axles at their outer ends, spring suspension means interconnecting said wheels, said means comprising an elongated rigid beam pivotally connected at its midpoint to said vehicle and coil springs interposed between the ends of said beam and said arms.

References Cited in the file of this patent

UNITED STATES PATENTS

| 1,947,337 | Fageol | Feb. 13, 1934 |

FOREIGN PATENTS

| 772,595 | France | Aug. 18, 1934 |
| 1,150,243 | France | Aug. 5, 1957 |
| 1,004,497 | Germany | Mar. 14, 1957 |